US011475530B2

(12) United States Patent
Marlow et al.

(10) Patent No.: US 11,475,530 B2
(45) Date of Patent: Oct. 18, 2022

(54) SYSTEMS, METHODS, AND USER INTERFACES IN A PATENT MANAGEMENT SYSTEM

(71) Applicant: Black Hills IP Holdings, LLC, Minneapolis, MN (US)

(72) Inventors: Thomas G. Marlow, Portland, ME (US); Mark D. Stignani, Minneapolis, MN (US); William E. Kalweit, Lakeville, MN (US)

(73) Assignee: Black Hills IP Holdings, LLC, Minneapolis, MN (US)

( * ) Notice: Subject to any disclaimer, the term of this patent is extended or adjusted under 35 U.S.C. 154(b) by 448 days.

(21) Appl. No.: 15/183,093

(22) Filed: Jun. 15, 2016

(65) Prior Publication Data

US 2016/0364818 A1 Dec. 15, 2016

Related U.S. Application Data (60) Provisional application No. 62/175,903, filed on Jun. 15, 2015.

(51) Int. Cl.
*G06Q 50/18* (2012.01)
*G06Q 10/06* (2012.01)

(52) U.S. Cl.
CPC ..... *G06Q 50/184* (2013.01); *G06Q 10/06398* (2013.01)

(58) Field of Classification Search
None
See application file for complete search history.

(56) References Cited

U.S. PATENT DOCUMENTS

2004/0181427 A1* 9/2004 Stobbs ............... G06Q 50/184
705/310
2005/0210009 A1* 9/2005 Tran .................... H04L 63/08
(Continued)

FOREIGN PATENT DOCUMENTS

WO WO-2013061152 A2 * 5/2013 ............. G06Q 10/10

OTHER PUBLICATIONS

Reference Lemley et al. Examiner Characteristics and Patent Office Outcomes. The Review of Economics and Statistics. Date: Aug. 1, 2012. https://direct.mit.edu/rest/article-abstract/94/3/817/58008/Examiner-Characteristics-and-Patent-Office?redirectedFrom=fulltext (Year: 2012).*

*Primary Examiner* — Patricia H Munson
*Assistant Examiner* — Nancy N Prasad
(74) *Attorney, Agent, or Firm* — Schwegman Lundberg & Woessner, P.A.

(57) ABSTRACT

A method may include receiving a search query from a computing device, the search query identifying an examiner in a patent office; in response to the receiving, gathering information associated with the examiner from at least one database, the information including experience metrics for the examiner and allowance metrics for the examiner; generating a user interface for display on the computing device; the user interface including: an experience section including a technology experience score for the examiner based on the experience metrics; and an allowance rate section that includes: allowance visualization options; and an allowance visualization based on the allowance metrics and a selected visualization option of the allowance visualization options.

15 Claims, 5 Drawing Sheets

(56) References Cited

U.S. PATENT DOCUMENTS

| | | | |
|---|---|---|---|
| 2007/0219853 A1* | 9/2007 | Van Luchene | G06Q 50/184 |
| | | | 705/310 |
| 2007/0220041 A1* | 9/2007 | Van Luchene | G06Q 10/06 |
| | | | 707/999.102 |
| 2015/0121185 A1* | 4/2015 | Holt | G06F 3/04817 |
| | | | 715/212 |

* cited by examiner

ABANDONED CASES NOTIFIER

*300*

*302* Matter Type Selection

- Class Selector ⌄ ○ Or ○ And
- Assignee Selector ⌄ ○ Or ○ And
- Date Selector ⌄ ○ Or ○ And

*304* Include List of Foreign matters? ○ No ○ Yes

*306* Pre-Abandonment Notification ○ No ○ Yes

| Time Selector ⌄ |
|---|
| 2 Months |
| 1 Month |
| 2 weeks |
| 1 week |

*308* Enter e-mail address(es) or mobile phone(s) number to notify

SYSTEMS, METHODS, AND USER INTERFACES IN A PATENT MANAGEMENT SYSTEM

CLAIM OF PRIORITY

This application claims the benefit of priority under 35 U.S.C. § 119(e) to U.S. Provisional Patent Application Ser. No. 62/175,903, filed on Jun. 15, 2015, the benefit of priority of which is claimed hereby, and which is incorporated by reference herein in its entirety.

TECHNICAL FIELD

Embodiments described herein generally relate to user interfaces and in particular, but without limitation, user interfaces in a patent management system.

BACKGROUND

In order to obtain a patent an applicant submits a patent application to one or more patent offices. Then, an examiner conducts a search to determine if the patent should be allowed.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In various examples, an application provides data to inform patentees or other users about the performance of examiners, art units, and tech centers at a patent office such as the United States Patent and Trademark Office (USPTO). The data may be used to determine a course of action to take during examination of a patent or other research purposes. The application may also generate notices and predictions of abandonments or expirations of applications or issued patents.

Figure 1:
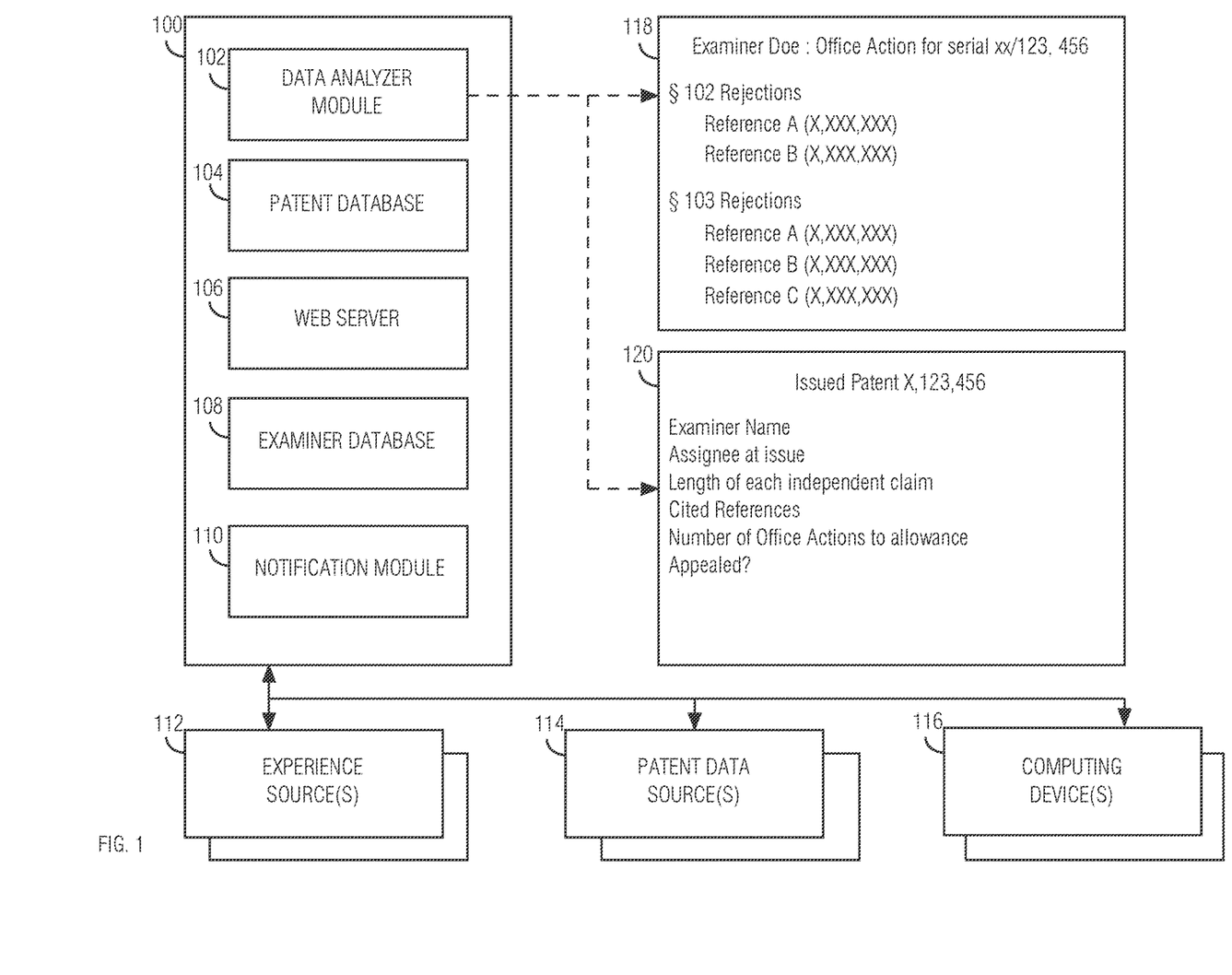
FIG. 1 is a schematic diagram of components of a patent analytics system, according to various examples.

FIG. 1 is a schematic diagram of components of a patent analytics system, according to various examples. The patent analytics system 100 may include a data analyzer module 102, patent database 104, web server 106, examiner database 108, and notification module 110. The patent analytics system 100 may transmit and receive data from experience sources 112 and patent data sources 114 via a network such as the Internet. The patent analytics system 100 may also receive and transmit data via the network to a computing device 116. While components 102-110 are illustrated in a single block, the components may be located on different computing devices and in different geographic locations.

In various examples, a user may use the computing device 116 (e.g., desktop computer, laptop, tablet, mobile phone) to begin execution of an application to interact with or help generate the data described herein. The application may be stored on the computing device 116 or may be served to the computing device 116 from a server, such as the web server 106. In various examples, the data presented to the user in the application may be locally stored, remotely stored, dynamically calculated, or combinations thereof. While a single application is described herein, multiple applications may be used. For example, one application may be used to retrieve a profile of an examiner—as described in more detail below—and a different application may be used to monitor potential abandonments. For illustration purposes, the application will be discussed as a web application served from the web server 106 to the computing device 116.

In an example, the patent database 104 is maintained on one or more storage devices (not shown). The storage device(s) may be located in the same computing device—such as patent analytics system 100—or distributed across multiple computing devices, which in turn may also be distributed across many geographical locations. The patent database 104 may be, but is not limited to, a relational database (e.g., SQL) a non-relational database, (e.g., NoSQL), or flat file database. For discussion purposes, terms common to relational databases operations are used throughout this disclosure.

In various examples, the data analyzer module 102 analyzes data received from external sources such as the patent data sources 114 before storing data in the patent database 104. The patent data sources 114 may be an official source of patent such as a website or other network accessible data repository managed by a national patent office. The patent data sources 114 may also be a third-party collector of patent data. The data from the patent data sources 114 may be in a raw format. For example, the USPTO offers tagged image file format (TIFF) images and portable document format (PDF) files of all public documents for a patent. Foreign patent offices may offer similar data.

In various examples, the patent analytics system 100 request patent data from the patent data sources 114 periodically to retrieve file histories of issued patents or patent applications (collectively referred to as patents) at the patent data sources 114. The patent analytics system 100 may also retrieve overview data provided by the patent data sources 114. The request may use an application programming interface (API) provided by the patent data sources 114 to request the patent data.

After receiving the patent data, the data analyzer module 102 may parse the raw data or overview data (e.g., using optical character recognition, screen scraping, field recognition, etc.) to retrieve details about each communication to and from the patent Office Action in the file histories of the patents. FIG. 1 illustrates Office Action details 118 that may be retrieved for an Office Action. As illustrated, the Office Action details 118 may include the serial number of the application, the examiner name and what references were cited for each rejection type. Other details may include the art unit and technology center responsible for issuing the Office Action, the supervising patent examiner (SPE) on the Office Action, and whether an interview was conducted. The details of each Office Action may be stored in one or more entries of the patent database 104 and/or the examiner database 108. For example, an entry in the patent database 104 may include the following:

Patent Serial No.
Office Action Date
Office Action Type [Non-Final, Final, Ex Parte Quayle, Restriction, etc.]
Examiner Name
SPE Name
Art Unit
Tech Center
Rejection Type [102, 103, etc.] with cited references by type
Number of previous Office Actions to allowance (breakdown by type [restrictions, final, non-final, RCEs, etc.])
Interview conducted? [In-person, telephonic]

In combination with the above described date, the data analyzer module 102 may also determine issued patent details 120, including the examiner's name, assignee at time of issue, length of each independent claim, references cited during prosecution, number of Office Actions (non-final and final) to issue, and whether or not an appeal was made during prosecution. Some of the issued patent details 120 may come from the content of the patent itself—as retrieved from the patent data sources 114. These details may be stored in one or more entries of the patent database 104 and examiner database 108.

The data analyzer module 102 may also analyze the success rate of arguments made in responses to an Office Action. A successful argument may be determined by looking at the art cited against a claim before and after an argument or by textual analysis of a response to arguments section of a subsequent Office Action. The data analyzer module 102 may also determine the success rate of cited case law by an Applicant in a response. For example, the outcome of citing a particular case in response to a § 101 rejection may be stored in a database. Over time, this may allow a user to see what cases are most likely to overcome § 101 rejections (or 112, 102, 103, etc.) A more granular approach may also be used. For example, a user of the application may be able to look at an individual examiner/art unit/tech center and see what case law has the best chance of success.

A user may use his/her computing device to access the data stored at the patent analytics system 100. In an example, the data is presented via one or more user interfaces served to the computing device 116. Although FIG. 2 (as well as FIGS. 3 and 4) are illustrated as user interfaces with defined sections, other types of customizable interfaces may be used. For example, a pivot table may be presented to allow a user to determine their own metrics using the data stored in the patent database 104 and the examiner database 108. The data may also be normalized using factors set by the user. For example, a user may be able to look at a specific reference and see how often it is cited by art unit normalized according to the number of filings for the art unit (as compared to other art units). In another example, a user may be able to look at an allowance rate/rejection rate of an examiner normalized to the length of the independent claim.

Figure 2:
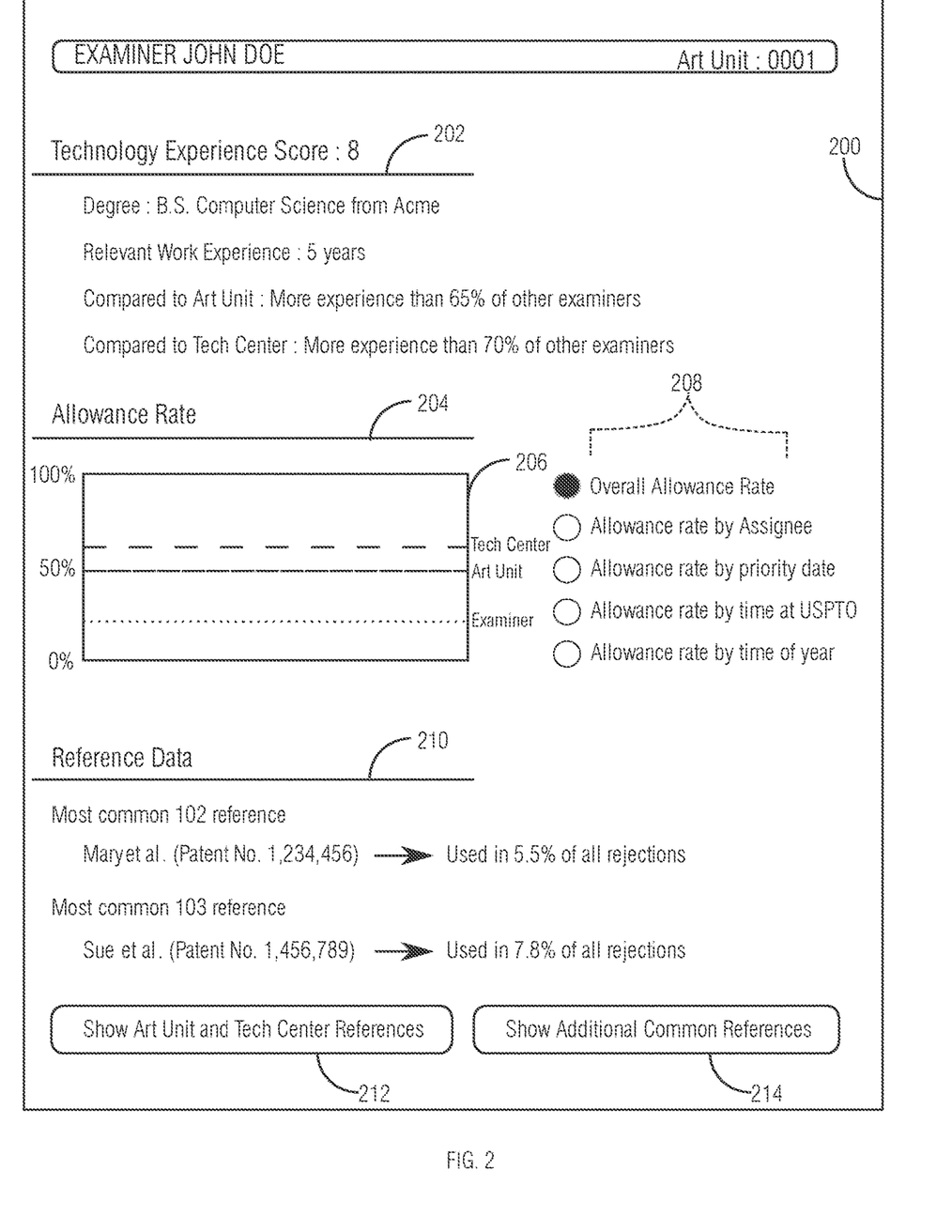
FIG. 2 is an examiner overview interface, according to various examples.

The pivot table (or other interface) may be use to track the performance of an examiner over time. For example, the allowance rate of the examiner may be examined when the examiner is a junior examiner, primary examiner, and supervisory examiner. If the examiner also becomes a technology center director the allowance rate of the technology center may tracked as well. The pivot table may also be used to see how the allowance rate of an examiner changes when the examiner changes art units.

One example user interface is illustrated in FIG. 2 as examiner overview 200. The top of the examiner overview 200 notes the examiner's name as well as the art unit of the examiner. The information presented in examiner overview 200 may be gathered (e.g., retrieved or calculated) based on information stored in one or more databases associated with the examiner as discussed in more detail below. The examiner overview 200 may be presented in response to the patent analytics system 100 receiving a search query (e.g., with an examiner's name) from the computing device 116 via a web page served from the web server 106. The overview may also have a date function to see the data for a specific date range (e.g., the past year). There may also be an option to compare two date ranges to see how the data changes over time (e.g., does a particular assignee get more allowances over time?) Similar overviews may be presented for art units and tech centers.

The examiner overview 200 illustrates a variety of sections: a technology experience section 202; an allowance rate section 204; and a reference section 210. The locations of these sections within the interface, the labels, and the data contained therein are examples—other locations may be used. Similarly, more or less data may be included in the examiner overview 200.

In an example, the experience section 202 includes an overview of the experience of the examiner as it relates to the examiner's art unit. The experience section 202 may include educational credentials and the length of any relevant work experience. As illustrated, the experience section 202 may include a score. The score may be based on a variety of factors depending on the preferences of a user. The formula may use weights for each factor and/or straight values. An example scoring formula may be based on the following components:

Education Component
    4 pts for having an undergraduate degree relevant to art unit
    4 pts for having a graduate degree relevant to art unit
USPTO Component
    1 pt. for each year in the art unit
Work Component
    1 pt. for each year in relevant job to art unit An example weighting of the individual components may be:

$$[(0.4)(\text{Education component})+(0.2)(\text{USPTO component})+(0.4)(\text{Work Component})]$$

There may be a default formula to calculate the examiner's technology experience score, but it may be modified by a user. For example, a user interface element may be included in the experience section 202 which, when activated (e.g., clicked), by a user displays the factors that go into the experience score. A user may select or deselect the factors, change the values given for each factors, and modify the weights for the factors. The changes may be transmitted to the patent analytics system 100 to recalculate the experience score. The examiner overview 200 may be updated as well in display the recalculated experience score.

The experience section 202 may also include metrics on how the examiner's credentials compare to other examiners in the art unit and tech center (e.g., an art unit experience comparison score and a technology center experience comparison score). For example, the experience section 202 indicates that Examiner Doe has a higher experience score than 65% of other examiner's in the art unit 0001 and higher than 70% of examiner's in the examiner's technology center.

In various examples, an experience score module (not shown) of the patent analytics system 100 calculates the experience. The experience score module may retrieve the values for the factors of the experience score from one or more databases of the patent analytics system 100. For example, the data analyzer module 102 education and work details of an examiner may be retrieved from the experience sources 112. The experience sources 112 may be websites, data services, or datastores that include education and work details on a variety of people, including examiners.

Example experience sources may include social networks, professional databases, and company websites. In an example, screen scraping techniques are used to retrieve education/work details of a person when an API is not available at an experience source. The retrieved education/work details may include, but are not limited to, degrees obtained or in process of being obtained from an educational institution, names of the educational institutions, and names of businesses worked at and starting/ending dates of the same. In various examples, the details gathered by the data analyzer module 102 are stored in the examiner database 108. The data analyzer module 102 may periodically check the experience sources 112 to retrieve updated details.

Using the default experience score formula—or user specified formula—the experience score module may calculate the experience score for the examiner. The calculated score may be stored in the examiner database 108. The web server 106 may retrieve the calculate score from the examiner database 108 and include it in experience section 202. In an example, the experience score is calculated upon request by the user (e.g., the score is not retrieved from a database). In an example, a user requests—via a user interface element—that the score be updated. Accordingly, the data analyzer module 102 may retrieve the work/education detail and the experience score module may calculate the updated score.

In various examples, the allowance rate section 204 includes allowance visualization 206 and allowance visualization options 208. The allowance rate section 204 display various allowance metrics for a given examiner. Similar metrics/visualizations may be used to present allowance rates for an art unit or tech center. As illustrated, allowance rate visualizations options may include an overall allowance rate, an allowance rate by assignee, allowance rate by priority date, allowance rate by examiner's time at the USPTO, and allowance rate by time of year. Other allowance rate visualization options may also be displayed without departing from the scope of this disclosure. The allowance visualization 206 may be updated in response to a user selecting an allowance rate visualization option.

In an example, the allowance rate by time of year is when in the year an examiner/art unit/tech center is most likely to allow a case. Depending on the preferences of a user, the allowance rate may be calculated for each day/week/month of the year. In an example, the patent analytics system 100 may correlate the allowance rate with quotas given to the examiners. For example, the patent analytics system 100 may compare an examiner's likelihood to allow cases near the quarter or year-end. A score may be given to each examiner based on this comparison. For example, a '0' score may mean that allowances are evenly distributed each week of the year (with an option to normalize given current case load). A score of '1' may mean that all cases are allowed in the last month of a quarter and a score of '−1' may mean all cases are allowed in the first month of a quarter—with values also possible in between. Scores may also be calculated for the year. Similar scores may be calculated for art units/tech centers.

In various examples, the reference section 210 displays the most common references cited by the examiner by rejection type. The reference section 210 also displays options 212 and 214 that, when activated by a user, may retrieve the most common cited references for an art unit/tech center or additional commonly cited references for the examiner, respectively. If no user of the patent analytics system 100 has requested this information before, the patent analytics system 100 may determine the most common references by querying the patent database 104 using the examiner's name as an input. In an example, after determining the most common references (e.g., reference metrics), the examiner database 108 may be updated using this information. A similarly analysis may be performed using the tech unit/art unit/class as an input to the patent database 104 to determine the most common references for a tech unit/art unit/class.

Figure 3:
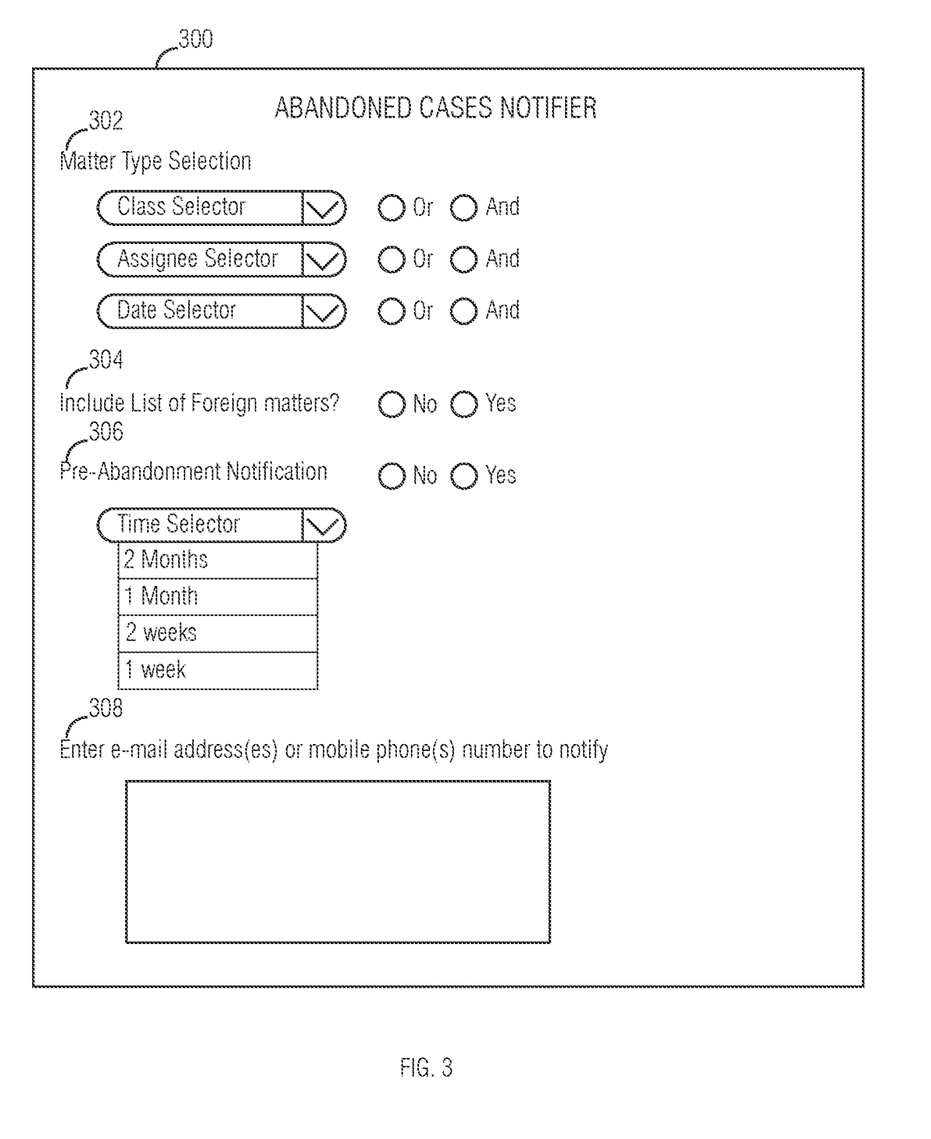
FIG. 3. is an abandoned cases notifier interface, according to various examples.

In an example, the patent analytics system 100 provides notification services with respect to abandoned patents and expired patents. FIG. 3 illustrates an example of abandoned cases notifier interface 300, according to an example embodiment. In an example, the web server 106 serves the abandoned cases notifier interface 300 that is rendered on a display device of the computing device 116. The abandoned cases notifier interface 300 includes matter type selections 302, foreign matter option 304, and time-period options 306, and address input box 308. A user may select which types of matters to be notified of using matter type selections 302. For example, a user may select a class of patents, certain assignees, or by priority/filing/issue date. The options may be conjunctive or disjunctive.

The user may also choose to have the notification include a list of foreign family matters—regardless of the foreign matter's status. Often when a U.S. patent goes abandoned, the foreign cases are also left to lapse. Thus, the notified party may become aware of likely abandoned foreign patents.

A user may also be notified of patent applications that might go abandoned in the near future. For example, the patent analytics system 100 may send notifications of applications that are nearing a final deadline. A user may select a time period using time-period options 306. The user may also enter in one or more e-mail addresses/phone numbers to receive the notification. Thus, a user may create a notification to receive a listing of all cases by a specific assignee with a specific classification that are within two weeks of going abandoned.

Figure 4:
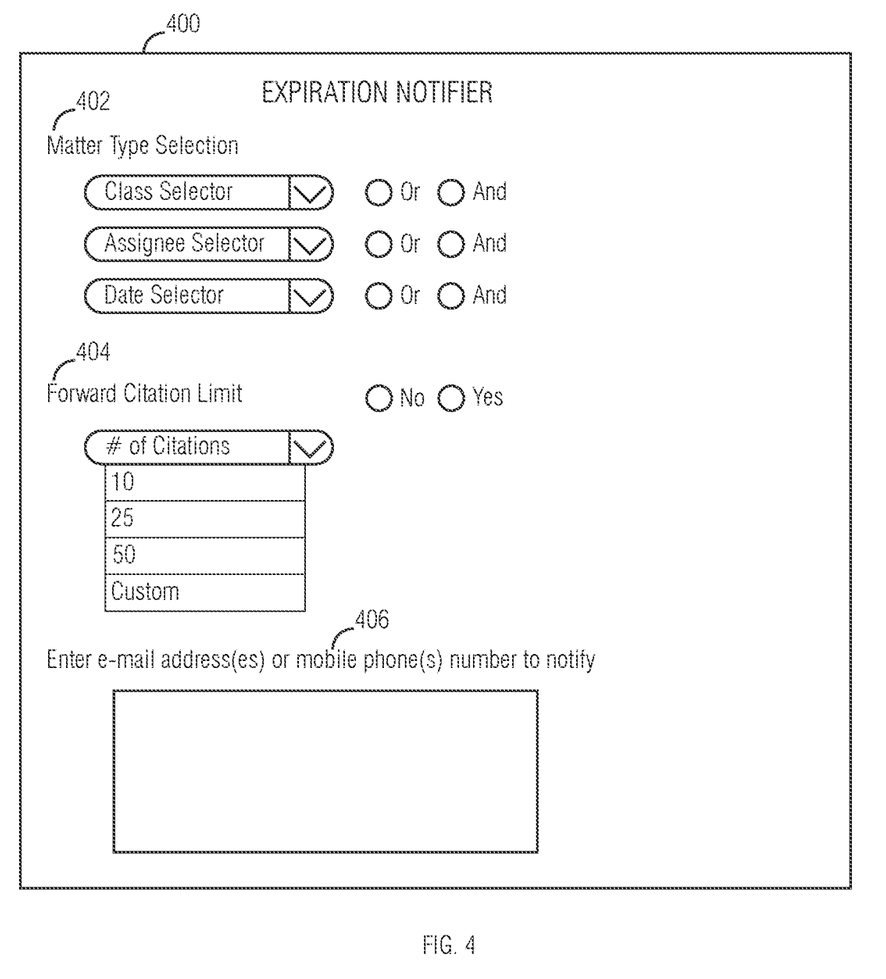
FIG. 4 is an expired cases notifier interface, according to various examples.

FIG. 4 illustrates an example expired cases notifier interface 400, according to an example embodiment. In an example, the web server 106 serves the expired cases notifier interface 400 that is rendered on a display device of the computing device 116. The expired cases notifier interface 400 includes matter type selections 402, citation limit option 404, and address input box 406. A user may select which types of matters to be notified of using matter type selections 402. For example, a user may select a class of patents, certain assignees, or by priority/filing/issue date. The options may be conjunctive or disjunctive. An expired matter may be a matter in which an annuity fee has not been paid or a patent with an expired term. In an example, a user may limit the number of matters according to the importance of the matter. For example, a user may choose a forward citation limit using citation limit option 404. If an expired patent has less than the limit it will not be included in the notification, in an example.

The patent analytics system 100 may provide a user interface to manage a user's notifications. Thus, a user may receive a listing of all currently enabled notifications. The list may also include options to disable or delete the notifications. The patent analytics system 100 may also include options to change the frequency of notifications (e.g., a weekly e-mail including all notifications).

Example Computer System

Embodiments described herein may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 5:
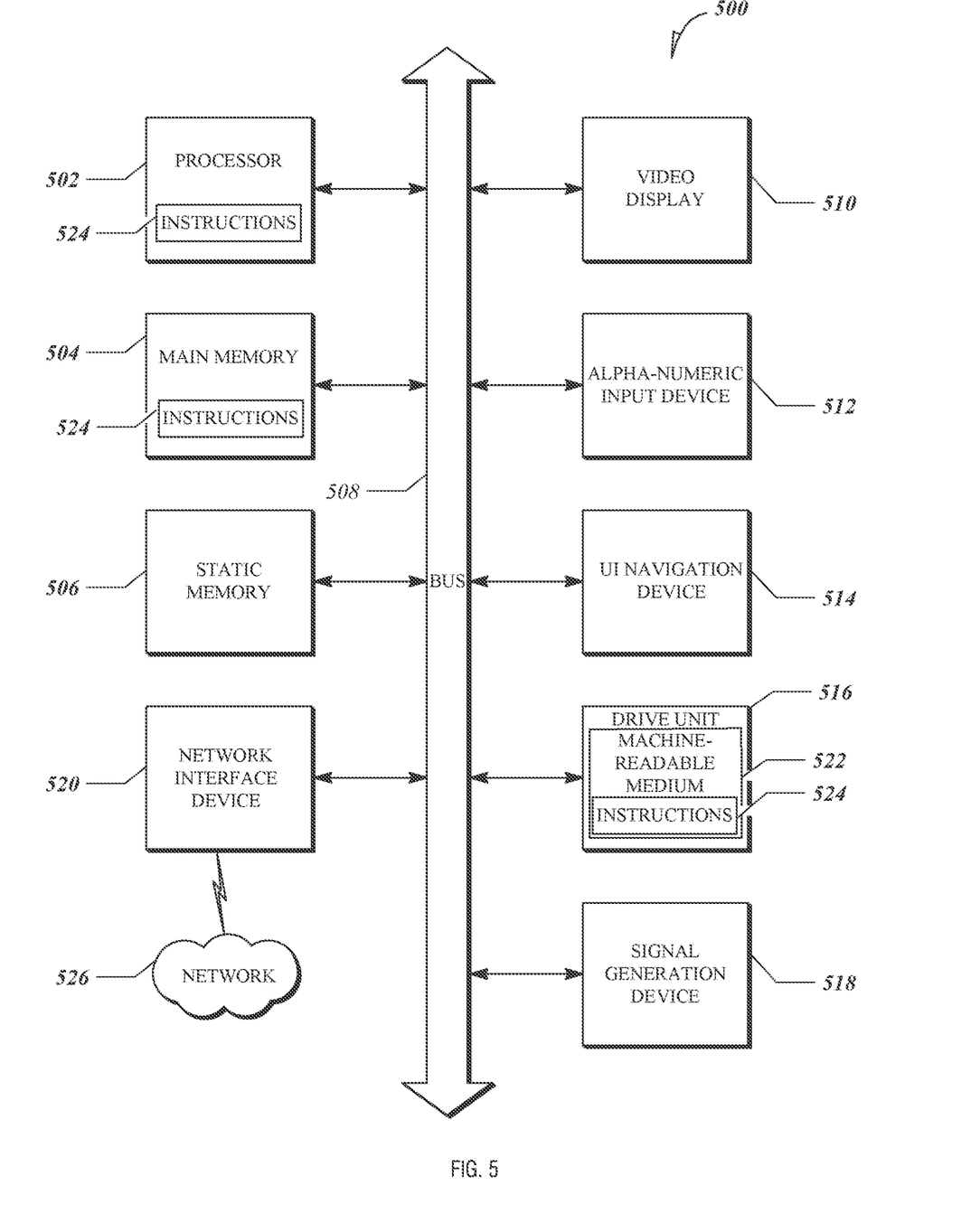
FIG. 5 is a block diagram illustrating an example machine upon which any one or more of the techniques (e.g., methodologies) discussed herein may be performed, according to an example embodiment.

FIG. 5 is a block diagram illustrating a machine in the example form of a computer system 500, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 500 includes at least one processor 502 (e.g., a central processing unit (CPU), a graphics processing unit (GPU) or both, processor cores, compute nodes, etc.), a main memory 504 and a static memory 506, which communicate with each other via a link 508 (e.g., bus). The computer system 500 may further include a video display unit 510, an alphanumeric input device 512 (e.g., a keyboard), and a user interface (UI) navigation device 514 (e.g., a mouse). In one embodiment, the video display unit 510, input device 512 and UI navigation device 514 are incorporated into a touch screen display. The computer system 500 may additionally include a storage device 516 (e.g., a drive unit), a signal generation device 518 (e.g., a speaker), a network interface device 520, and one or more sensors (not shown), such as a global positioning system (GPS) sensor, compass, accelerometer, or other sensor.

The storage device 516 includes a machine-readable medium 522 on which is stored one or more sets of data structures and instructions 524 (e.g., software) embodying or utilized by any one or more of the methodologies or functions described herein. The instructions 524 may also reside, completely or at least partially, within the main memory 504, static memory 506, and/or within the processor 502 during execution thereof by the computer system 500, with the main memory 504, static memory 506, and the processor 502 also constituting machine-readable media.

While the machine-readable medium 522 is illustrated in an example embodiment to be a single medium, the term "machine-readable medium" may include a single medium or multiple media (e.g., a centralized or distributed database, and/or associated caches and servers) that store the one or more instructions 524. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

What is claimed is:

1. A method for identifying commonly cited references, comprising:
    generating an application programming interface (API) call for obtaining examiner data for an examiner in a patent office from a set of experience sources;
    submitting the API call to the set of experience sources;
    parsing the examiner data, retrieved in response to the API call, to identify educational experience, patent office experience, and work experience;
    generating a technology experience score for the examiner based on the experience metrics, wherein the technology score is generated by applying an educational experience score, a patent office experience score, and a work experience score to a technology scoring formula, and comprises:
    calculating the educational experience score as a sum of numerical values assigned to educational degrees in the educational experience based on determined relevance to a patent art unit of the patent office;
    calculating the patent office experience score as a sum of numerical values assigned to years the examiner has worked in the patent art unit as determined from the patent office experience; and
    calculating the work experience score as a sum of numerical values assigned to years worked in jobs determined relevance to the patent art unit in the work experience;
    generating a user interface for display on a computing device as a pivot table;
    receiving, via the user interface, a search query, the search query identifying the examiner in the patent office;
    querying at least one database with the search query;
    in response to the querying, receiving results from the at least one database, the results including experience metrics for the examiner, reference metrics for the examiner, and allowance metrics for the examiner, wherein the reference metrics includes references cited by the examiner for patent rejections and wherein the allowance metrics includes case law references cited in office action responses against patent rejections of the examiner;
    displaying on the user interface in the pivot table, a name for the examiner, an experience section, a reference section, and an allowance rate section, wherein the experience section includes a technology experience score for the examiner based on the experience metrics, the reference section includes the reference metrics, and the allowance rate section includes:
    the allowance metrics;
    allowance visualization options; and
    an allowance visualization based on the allowance metrics and a selected visualization option of the allowance visualization options;
    calculating for each respective reference of the references cited, a total number of instances where the respective reference was cited by the examiner;
    selecting references for a list of most common references cited by the examiner in rejections based on the total calculated for each respective reference of the references cited;
    transmitting an update command to the at least one database for an entry of the examiner with the list of the common references cited by the examiner in rejections;
    calculating for each respective case law reference of the case law references cited in office action responses against patent rejections, a total number of instances where the respective case law reference was cited in office action responses against patent rejections for patent applications which were allowed;
    selecting case law references for a list of the most common case law references cited in office action responses against patent rejections for allowed patent applications based on the total calculated for each respective case law reference of the case law references cited;
    displaying in the reference section of the user interface, the list of the most common references cited by the examiner in rejections based on the total calculated for each respective reference of the references cited; and
    displaying in the allowance rate section of the user interface, the list of the most common case law references cited in office action responses against patent rejections for allowed patent applications based on the total calculated for each respective case law reference of the case law references cited.

2. The method of claim 1, further comprising:
    comparing the technology experience score for the examiner to technology experience scores for other examiners in an art unit of the examiner to determine an art unit experience comparison score; and
    wherein the experience section includes the art unit experience comparison score.

3. The method of claim 1, wherein the allowance visualization options include an option to display an examiner's allowance rate by assignee and wherein the allowance visualization is updated based on selection of the option.

4. The method of claim 1, wherein the allowance visualization options include an option to display an examiner's allowance rate by time of year and wherein the allowance visualization is updated based on selection of the option.

5. The method of claim 1, wherein the reference section indicates a percentage of cases a reference of the list of the most common references is used in.

6. A system for identifying commonly cited references, comprising:
    at least one processor;
    a storage device comprising instructions, which when executed by at least one processor, configure the at least one processor to perform operations comprising:
        generating an application programming interface (API) call for obtaining examiner data for an examiner in a patent office from a set of experience sources;
        submitting the API call to the set of experience sources;
        parsing the examiner data, retrieved in response to the API call, to identify educational experience, patent office experience, and work experience;
        generating a technology experience score for the examiner based on the experience metrics, wherein the technology score is generated by applying an educational experience score, a patent office experience score, and a work experience score to a technology scoring formula, and comprises:
            calculating the educational experience score as a sum of numerical values assigned to educational degrees in the educational experience based on determined relevance to a patent art unit of the patent office;
            calculating the patent office experience score as a sum of numerical values assigned to years the examiner has worked in the patent art unit as determined from the patent office experience; and
            calculating the work experience score as a sum of numerical values assigned to years worked in jobs determined relevance to the patent art unit in the work experience;
        generating a user interface for display on a computing device as a pivot table;
        receiving, via the user interface, a search query, the search query identifying the examiner in the patent office;
        querying at least one database with the search query;
        in response to the querying, receiving results from the at least one database, the results including experience metrics for the examiner, reference metrics for the examiner, and allowance metrics for the examiner, wherein the reference metrics includes references cited by the examiner for patent rejections and wherein the allowance metrics includes case law references cited in office action responses against patent rejections of the examiner;
        displaying on the user interface in the pivot table, a name for the examiner, an experience section, a reference section, and an allowance rate section, wherein the experience section includes a technology experience score for the examiner based on the experience metrics, the reference section includes the reference metrics, and the allowance rate section includes:
            the allowance metrics;
            allowance visualization options; and
            an allowance visualization based on the allowance metrics and a selected visualization option of the allowance visualization options;
        calculating for each respective reference of the references cited, a total number of instances where the respective reference was cited by the examiner;
        selecting references for a list of most common references cited by the examiner in rejections based on the total calculated for each respective reference of the references cited;
        transmitting an update command to the at least one database for an entry of the examiner with the list of the common references cited by the examiner in rejections;
        calculating for each respective case law reference of the case law references cited in office action responses against patent rejections, a total number of instances where the respective case law reference was cited in office action responses against patent rejections for patent applications which were allowed;
        selecting case law references for a list of the most common case law references cited in office action responses against patent rejections for allowed patent applications based on the total calculated for each respective case law reference of the case law references cited;
        displaying in the reference section of the user interface, the list of the most common references cited by the examiner in rejections based on the total calculated for each respective reference of the references cited; and
        displaying in the allowance rate section of the user interface, the list of the most common case law references cited in office action responses against patent rejections for allowed patent applications based on the total calculated for each respective case law reference of the case law references cited.

7. The system of claim 6, wherein the storage device further comprises instructions, which when executed by at least one processor, configure the at least one processor to perform operations comprising:
    comparing the technology experience score for the examiner to technology experience scores for other examiners in an art unit of the examiner to determine an art unit experience comparison score; and
    wherein the experience section includes the art unit experience comparison score.

8. The system of claim 6, wherein the allowance visualization options include an option to display an examiner's allowance rate by assignee and wherein the allowance visualization is updated based on selection of the option.

9. The system of claim 6, wherein the allowance visualization options include an option to display an examiner's allowance rate by time of year and wherein the allowance visualization is updated based on selection of the option.

10. The system of claim 6, wherein the reference section indicates a percentage of cases a reference of the list of the most common references is used in.

11. A non-transitory computer-readable medium for identifying commonly cited references, comprising instructions, which when executed by at least one processor, configure the at least one processor to perform operations comprising:
    generating an application programming interface (API) call for obtaining examiner data for an examiner in a patent office from a set of experience sources;
    submitting the API call to the set of experience sources;
    parsing the examiner data, retrieved in response to the API call, to identify educational experience, patent office experience, and work experience;
    generating a technology experience score for the examiner based on the experience metrics, wherein the technology score is generated by applying an educational experience score, a patent office experience score, and a work experience score to a technology scoring formula, and comprises:
  calculating the educational experience score as a sum of numerical values assigned to educational degrees in the educational experience based on determined relevance to a patent art unit of the patent office;
  calculating the patent office experience score as a sum of numerical values assigned to years the examiner has worked in the patent art unit as determined from the patent office experience; and
  calculating the work experience score as a sum of numerical values assigned to years worked in jobs determined relevance to the patent art unit in the work experience;
generating a user interface for display on a computing device as a pivot table;
receiving, via the user interface, a search query, the search query identifying the examiner in the patent office;
querying at least one database with the search query;
in response to the querying, receiving results from the at least one database, the results including experience metrics for the examiner, reference metrics for the examiner, and allowance metrics for the examiner, wherein the reference metrics includes references cited by the examiner for patent rejections and wherein the allowance metrics includes case law references cited in office action responses against patent rejections of the examiner;
displaying on the user interface in the pivot table, a name for the examiner, an experience section, a reference section, and an allowance rate section, wherein the experience section includes a technology experience score for the examiner based on the experience metrics, the reference section includes the reference metrics, and the allowance rate section includes:
  the allowance metrics;
  allowance visualization options; and
  an allowance visualization based on the allowance metrics and a selected visualization option of the allowance visualization options;
calculating for each respective reference of the references cited, a total number of instances where the respective reference was cited by the examiner;
selecting references for a list of most common references cited by the examiner in rejections based on the total calculated for each respective reference of the references cited;
transmitting an update command to the at least one database for an entry of the examiner with the list of the common references cited by the examiner in rejections;
calculating for each respective case law reference of the case law references cited in office action responses against patent rejections, a total number of instances where the respective case law reference was cited in office action responses against patent rejections for patent applications which were allowed;
selecting case law references for a list of the most common case law references cited in office action responses against patent rejections for allowed patent applications based on the total calculated for each respective case law reference of the case law references cited;
displaying in the reference section of the user interface, the list of the most common references cited by the examiner in rejections based on the total calculated for each respective reference of the references cited and
displaying in the allowance rate section of the user interface, the list of the most common case law references cited in office action responses against patent rejections for allowed patent applications based on the total calculated for each respective case law reference of the case law references cited.

12. The computer-readable medium of claim 11, wherein the computer-readable medium further comprises instructions, which when executed by at least one processor, configure the at least one processor to perform operations comprising:
  comparing the technology experience score for the examiner to technology experience scores for other examiners in an art unit of the examiner to determine an art unit experience comparison score; and
  wherein the experience section includes the art unit experience comparison score.

13. The computer-readable medium of claim 11, wherein the allowance visualization options include an option to display an examiner's allowance rate by assignee and wherein the allowance visualization is updated based on selection of the option.

14. The computer-readable medium of claim 11, wherein the allowance visualization options include an option to display an examiner's allowance rate by time of year and wherein the allowance visualization is updated based on selection of the option.

15. The computer-readable medium of claim 11, wherein the reference section indicates a percentage of cases a reference of the list of the most common references is used in.

* * * * *